(12) United States Patent
Anderson et al.

(10) Patent No.: US 7,844,280 B2
(45) Date of Patent: Nov. 30, 2010

(54) LOCATION OF WIDEBAND OFDM TRANSMITTERS WITH LIMITED RECEIVER BANDWIDTH

(75) Inventors: Robert J. Anderson, Phoenixville, PA (US); Rashidus S. Mia, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 940 days.

(21) Appl. No.: 11/609,817

(22) Filed: Dec. 12, 2006

(65) Prior Publication Data
US 2008/0137524 A1    Jun. 12, 2008

(51) Int. Cl.
| | |
|---|---|
| H04M 11/04 | (2006.01) |
| H04W 24/00 | (2009.01) |
| H04B 17/00 | (2006.01) |
| H04B 7/204 | (2006.01) |
| H03C 1/62 | (2006.01) |

(52) U.S. Cl. .............. 455/456.1; 455/404.2; 455/456.5; 455/456.6; 455/67.11; 455/115.1; 370/319

(58) Field of Classification Search ................. 370/203; 455/404.2, 456.1, 456.5, 456.6, 67.11, 115.1
See application file for complete search history.

(56) References Cited

U.S. PATENT DOCUMENTS

| | | | | |
|---|---|---|---|---|
| 5,327,144 | A |  | 7/1994 | Stilp et al. .................. 342/387 |
| 6,047,192 | A | * | 4/2000 | Maloney et al. .......... 455/456.2 |
| 6,091,362 | A |  | 7/2000 | Stilp et al. .................. 342/465 |
| 6,646,604 | B2 | * | 11/2003 | Anderson ................... 342/465 |
| 7,050,419 | B2 |  | 5/2006 | Azenkot et al. ............. 370/347 |
| 2004/0001018 | A1 | * | 1/2004 | Hales .......................... 341/155 |
| 2004/0047324 | A1 | * | 3/2004 | Diener ....................... 370/338 |
| 2004/0066736 | A1 |  | 4/2004 | Kroeger ...................... 375/259 |
| 2006/0178145 | A1 |  | 8/2006 | Floam et al. ................ 455/434 |
| 2006/0250935 | A1 |  | 11/2006 | Hamamoto et al. ......... 370/208 |
| 2006/0274684 | A1 |  | 12/2006 | Diener ........................ 455/456 |
| 2007/0072621 | A1 | * | 3/2007 | Mukkavilli et al. ...... 455/456.1 |
| 2008/0055591 | A1 | * | 3/2008 | Walton .................... 356/237.1 |
| 2009/0017837 | A1 | * | 1/2009 | Kim et al. ................ 455/456.1 |
| 2009/0115658 | A1 | * | 5/2009 | Zimmerman et al. ... 342/357.12 |
| 2009/0207926 | A1 | * | 8/2009 | Huang et al. ................ 375/260 |

OTHER PUBLICATIONS

Patent Cooperation Treaty, "Notification of transmittal of the international search report and the written opinion of the international searching authority, or the declaration," International Searching Authority, 2008, 11 pages.

* cited by examiner

*Primary Examiner*—Kamran Afshar
*Assistant Examiner*—Munsoon Choo
(74) *Attorney, Agent, or Firm*—Woodcock Washburn LLP

(57) ABSTRACT

One illustrative embodiment takes the form of a system for locating wireless transmitters employing an Orthogonal Frequency Division Multiplexing (OFDM) digital modulation scheme. The OFDM scheme comprises transmitting signal components over narrowband frequency channels spanning a wideband channel. The system includes a first receiving system configured to receive a fraction of the signal components transmitted by a first wireless transmitter to be located in a fraction of the narrowband frequency channels, and to process the fraction of the signal components to derive location related measurements. The system further includes at least a second receiving system configured to receive the fraction of the signal components transmitted by the first wireless transmitter, and to process this fraction of the signal components to derive location related measurements. The system also includes a processing system configured to use location related measurements from the first and second receiving systems to compute the location of the wireless transmitter.

98 Claims, 11 Drawing Sheets

LOCATION OF WIDEBAND OFDM TRANSMITTERS WITH LIMITED RECEIVER BANDWIDTH

TECHNICAL FIELD

The present invention relates generally to the field of wireless communications, and more specifically to the location of wireless devices within the coverage area of a wireless communications network. Wireless devices, also called mobile stations (MS), include those such as used in analog or digital cellular systems, personal communications systems (PCS), enhanced specialized mobile radios (ESMRs), wide-area-networks (WANs), and other types of wireless communications systems. This field is now generally known as wireless location, and has application for Wireless E911, fleet management, RF optimization, security, and other valuable applications.

BACKGROUND

A. Wireless Location

Early work relating to Wireless Location Systems is described in U.S. Pat. No. 5,327,144, Jul. 5, 1994, "Cellular Telephone Location System," which discloses a system for locating cellular telephones using time difference of arrival (TDOA) techniques. This and other exemplary patents (discussed below) are assigned to TruePosition, Inc., the assignee of the present invention.

The '144 patent describes what may be referred to as an uplink-time-difference-of-arrival (U-TDOA) cellular telephone location system. The described system may be configured to monitor control channel transmissions from one or more cellular telephones and to use central or station-based processing to compute the geographic location(s) of the phone(s). For example, in station-based processing, which may be employed for reverse control channel signal detection, cross-correlations are performed at the cell sites (or signal collection systems) in the following manner: For each "strong" signal, which may be considered a reference signal, received on a particular control channel at a particular first cell site, that strong signal is first applied to a signal decoder, such as that used by the cellular system itself. This decoder demodulates the cellular signal to produce the original digital bit stream which had been modulated to produce the cellular signal. This digital bit stream is then modulated by the cell site system to reconstruct the original signal waveform as it was first transmitted by the cellular telephone. This reconstructed signal waveform is cross-correlated against the received signal at the first cell site. The cross-correlation produces a peak from which an exact time of arrival can be calculated from a predetermined point on the peak. The first cell site system then sends the demodulated digital bit stream and the time of arrival to the central site over the communications line. The central site then distributes the demodulated digital bit stream and the exact time of arrival to other cell sites likely to have also received the cellular transmission. At each of these other second, third, fourth, etc., cell sites, the digital bit stream is modulated by the cell site system to reconstruct the original signal waveform as it was first transmitted by the cellular telephone. This reconstructed signal waveform is cross-correlated against the signal received at each cell site during the same time interval. The cross-correlation may or may not produce a peak; if a peak is produced, an exact time of arrival (TOA) can be calculated from a predetermined point on the peak. This TOA is then sent to the central site, and a delay difference, or TDOA, for a particular pair of cell sites can be calculated. This method permits the cell site systems to extract TOA information from an extremely weak signal reception, where the weak signal may be above or below the noise level. This method is applied iteratively to sufficient pairs of cell sites for each strong signal received at each cell site for each sample period. The results of the delay pairs for each signal are then directed to the location calculation algorithm.

TruePosition and others (e.g., KSI, Inc.) have continued to develop significant enhancements to the original inventive concepts. Some examples are discussed below.

U.S. Pat. No. 6,047,192, Apr. 4, 2000, "Robust, Efficient, Localization System," is another example of a prior art patent describing a similar process (referred to as "matched-replica processing") for processing mobile transmitter signals to determine location related signal parameters, which may be employed to calculate the transmitter location.

Another exemplary prior art patent is U.S. Pat. No. 6,091,362, Jul. 18, 2000, "Bandwidth Synthesis for Wireless Location System." This patent describes a system and process offering improved accuracy of location information and greater time resolution. In the described system, signals transmitted by wireless telephones are received at a plurality of signal collection sites. To improve the accuracy of the location information, the system synthesizes greater bandwidth, and thus greater time resolution, than would otherwise be available. The location system can issue commands to cause a wireless transmitter to be located to change frequency channels, and a doubly-differenced carrier phase of the transmitted signal, or the TDOA, is observed at each of many frequencies spanning a wide bandwidth. The phase-measurement data from these many frequencies are combined to resolve the inherent integer-wavelength ambiguity. The invention may be utilized to obtain a bandwidth greater than the typical bandwidth of the signals to be cross-correlated (in either the time or frequency domains) in a cellular telephone location application.

Another example is U.S. Pat. No. 6,646,604, Nov. 11, 2003, "Automatic Synchronous Tuning of Narrowband Receivers of a Wireless Location System for Voice/Traffic Channel Tracking." This patent describes a transmitter locating method that involves performing location processing on signals received during an automatic sequential tuning mode of operation, wherein narrowband receivers are tuned sequentially and in unison to a plurality of predefined RF channels. Signal transmissions of interest in these channels are digitally recorded and used in location processing. The identity of the located transmitter(s) is determined by matching a location record to data indicating which wireless transmitters were in use at a time corresponding to the location record, and which cell sites and RF channels were used by each wireless transmitter.

An example of a wireless location system (WLS) of the kind described above is depicted in FIG. 1. As shown, the system includes four major subsystems: the Signal Collection Systems (SCS's) 10, the TDOA Location Processors (TLP's) 12, the Application Processors (AP's) 14, and the Network Operations Console (NOC) 16. Each SCS is responsible for receiving the RF signals transmitted by the wireless transmitters on both control channels and voice channels. In general, an SCS (now sometimes called an LMU, or Location Measuring Unit) is preferably installed at a wireless carrier's cell site, and therefore operates in parallel to a base station. Each TLP 12 is responsible for managing a network of SCS's 10 and for providing a centralized pool of digital signal processing (DSP) resources that can be used in the location calculations. The SCS's 10 and the TLP's 12 operate together to determine the location of the wireless transmitters. Both the SCS's 10 and TLP's 12 contain a significant amount of DSP resources, and the software in these systems can operate dynamically to determine where to perform a particular processing function based upon tradeoffs in processing time, communications time, queuing time, and cost. Each TLP 12 exists centrally primarily to reduce the overall cost of implementing the WLS. In addition, the WLS may include a plurality of SCS regions each of which comprises multiple SCS's 10. For example, "SCS Region 1" includes SCS's 10A and 10B that are located at respective cell sites and share antennas with the base stations at those cell sites. Drop and insert units 11A and 11B are used to interface fractional T1/E1 lines to full T1/E1 lines, which in turn are coupled to a digital access and control system (DACS) 13A. The DACS 13A and another DACS 13B are used in the manner described more fully below for communications between the SCS's 10A, 10B, etc., and multiple TLP's 12A, 12B, etc. As shown, the TLP's are typically collocated and interconnected via an Ethernet network (backbone) and a second, redundant Ethernet network. Also coupled to the Ethernet networks are multiple AP's 14A and 14B, multiple NOC's 16A and 16B, and a terminal server 15. Routers 19A and 19B are used to couple one WLS to one or more other Wireless Location System(s).

B. Evolving Wireless Standards and Air Interface Protocols

Over the past few years, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. The air interface protocols now used in the wireless industry include AMPS, N-AMPS, TDMA, CDMA, GSM, TACS, ESMR, GPRS, EDGE, UMTS WCDMA, and others. UMTS is a wideband CDMA air interface protocol defined by ETSI 3GPP. This protocol is similar to the CDMA protocols in EIA/TIA IS-95, or CDMA 2000, but does not require synchronization of the base stations, and also provides a high level of interoperability with GSM network infrastructure.

Orthogonal Frequency Division Multiplexing (OFDM) is a multiplexing technique in which a given subscriber may be assigned many frequency channels over which it will simultaneously transmit. The multiplexing scheme provides high bandwidth efficiency and broadband wireless communication in a high multi-path environment. WiFi as defined in IEEE 802.11 and WiMax as defined in IEEE 802.16 utilize OFDM. It is expected that IEEE 802.20 (when re-ratified) will utilize OFDM.

Uplink TDOA location of fourth generation (4G) broadband OFDM signals with bandwidths that can exceed 20 MHz requires expensive receiver and signal processing hardware. The SCSs (or LMUs) may be required to receive, sample, store and process these broadband signals, making the hardware significantly more expensive than what is required for third generation (3G) signals, such as UMTS or CDMA 2000 WCDMA signals occupying a bandwidth of 3-5 Mhz. As described in greater detail below, a goal of the present invention is to provide a way to accomplish U-TDOA location on the broadband 4G waveforms by collecting and processing only a portion of the transmitted signal, reducing the required bandwidth, memory, and digital signal processing required in the SCS/LMU, while still achieving high accuracy.

SUMMARY

The following summary is intended to explain several aspects of the illustrative embodiments described in greater detail below. This summary is not intended to cover all inventive aspects of the disclosed subject matter, nor is it intended to limit the scope of protection of the claims set forth below.

One illustrative embodiment of the present invention takes the form of a system for locating wireless transmitters employing an Orthogonal Frequency Division Multiplexing (OFDM) digital modulation scheme. The OFDM scheme comprises transmitting signal components over a plurality of predefined narrowband frequency channels spanning a predefined wideband channel. The system includes a first receiving system configured to receive a fraction of the signal components transmitted by a first wireless transmitter to be located in a fraction of the predefined narrowband frequency channels, and to process the fraction of the signal components to derive location related measurements. The system further includes at least a second receiving system configured to receive the said fraction of the signal components transmitted by the first wireless transmitter, and to process this said fraction of the signal components to derive location related measurements. The system also includes a processing system configured to use location related measurements from the first and second receiving systems to compute the location of the wireless transmitter.

Other aspects of the embodiments disclosed herein are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative or presently preferred embodiments of the present invention. First, we provide an overview and then a more detailed description.

A. Overview

Figure 10:
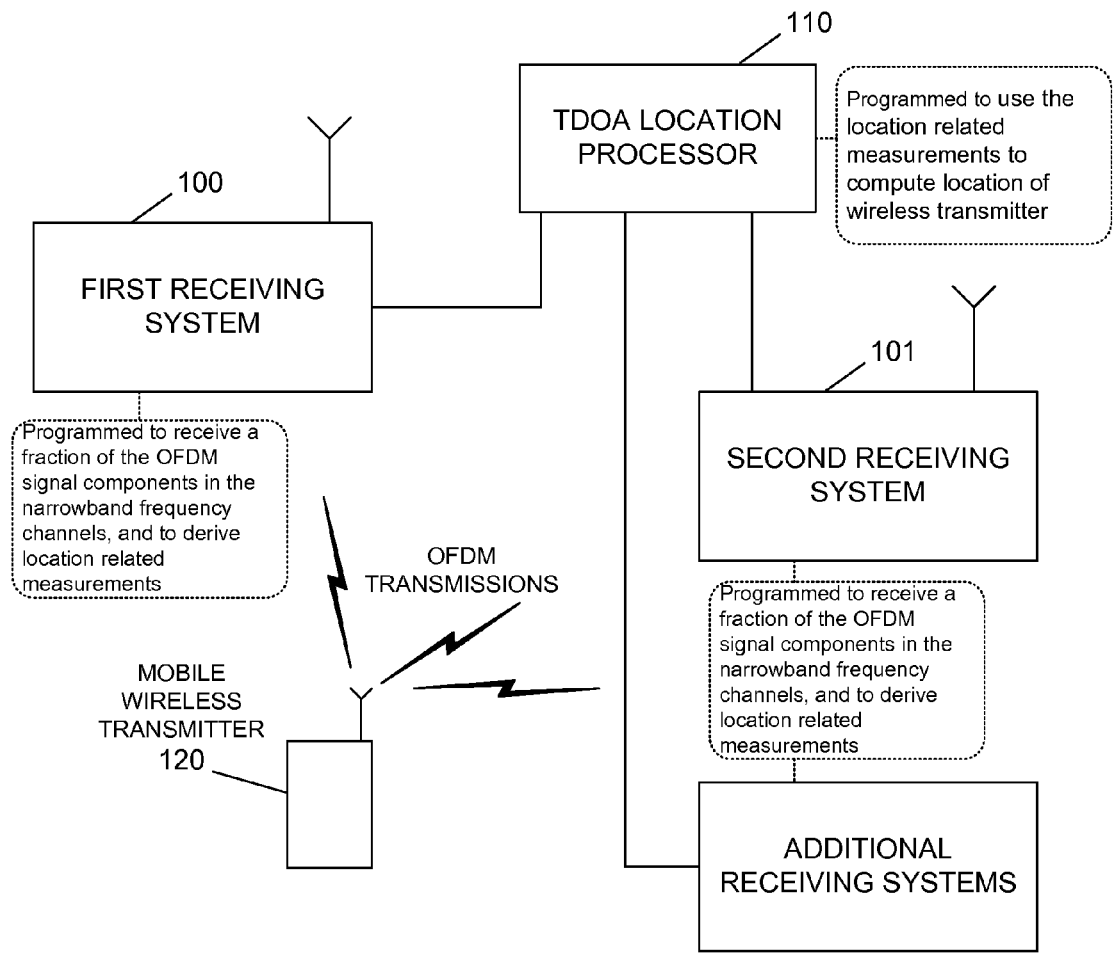
FIG. 10 schematically depicts a Wireless Location System for locating OFDM transmitters in accordance with an illustrative embodiment.

The present invention may be embodied in various forms, e.g., as a system, method, or computer readable medium bearing executable instructions for carrying out the inventive process. For example, a system in accordance with the present invention may be implemented as a system for locating wireless transmitters employing an Orthogonal Frequency Division Multiplexing (OFDM) digital modulation scheme. The illustrative system is shown schematically in FIG. 10. The OFDM scheme comprises transmitting signal components over a plurality of narrowband frequency channels spanning a wideband channel. The system includes first and second receiving systems (elements 100 and 101 in FIG. 10), which may take the form of an SCS or LMU co-located at a base transceiver station of a wireless communications system, although this is by no means required. The receiving systems are each configured to receive a fraction of the signal components transmitted by a wireless transmitter to be located (element 120 in FIG. 10) in a fraction of the narrowband frequency channels, and to process the signal components to derive location related measurements. These measurements are then provided to a processing system (element 110) configured to use the location related measurements to compute the location of the wireless transmitter. The processing system may take the form of a TLP of the kind referred to above, although this is not required.

The location related measurements derived by the receiving systems may comprise measurements of time difference of arrival (TDOA), time of arrival (TOA), angle of arrival (AOA), round trip time, power, or another form of measurement that may be used to calculate the location of the wireless transmitter.

The fraction of the narrowband frequency channels received by the receiving systems may include at least one pilot channel in which the wireless transmitter transmits energy, and the receiving systems may be configured to use signal components in the pilot channel to aid in signal acquisition and demodulation. Moreover, the fraction of the narrowband frequency channels may exclude guard channels in which the wireless transmitter transmits minimal energy.

The receiving systems may each include a radio frequency (RF) filter, and they are preferably each configured to receive signal components within a bandwidth compatible with the RF filter. The receiving systems may also include an intermediate frequency (IF) filter, and are preferably configured to receive signal components within a bandwidth compatible with the IF filter. In addition, the receiving systems may each include an analog to digital converter (ADC) characterized by a sample rate, and are preferably configured to receive signal components within a bandwidth compatible with the sample rate. The ADCs may be characterized by a sample rate after decimation, and the receiving systems may be configured to receive signal components within a bandwidth compatible with the sample rate after decimation. The receiving systems may also include available memory for storing data representing received signal components, and may be configured to receive signal components within a bandwidth compatible with the available memory. The receiving systems may also include digital signal processors (DSPs) characterized by DSP processing throughput, and may be configured to receive signal components within a bandwidth compatible with the DSP processing throughput.

The receiving systems may be configured to receive signal components within a bandwidth compatible with a current load on the receiving system. For example, the amount of DSP processing available within the receiving system (e.g., SCS) at any point in time may be a function of the location processing load on the system. If the load happens to be lower, and adequate DSP processing resources are available, then a wider portion of the transmitted bandwidth could be processed. However, if the load on the receiving system is high, a smaller portion of transmitted bandwidth would be processed to reduce the processing load on the DSP resources.

The receiving systems may also be configured to tune to a plurality of channels to receive signals from a plurality of wireless transmitters to be located. In addition, the receiving systems may be configured to tune to a plurality of selected channels, wherein the selected channels are determined based upon interference levels. For example, higher interference could reduce the ability for receiving systems (e.g., LMUs) to detect signals, and could reduce the accuracy of computed locations. In general, it is better to select the portion of transmitted spectrum that is least used by other transmitters. The level of interference over different sections of the transmitted signal can be determined by making power measurements at the receiving system, and/or by using the knowledge of the channels used by other transmitters in the network. The wireless network itself should have knowledge of the spectrum utilization.

The selected channels may be determined based upon various factors, including but not limited to measurements of received signals and spectrum usage.

A bandwidth synthesis process may also be advantageously employed in connection with the present invention.

Moreover, use of the present invention may also involve use of a sequential or random pattern of re-tuning a frequency agile receiver to cover most or all of the OFDM waveform spectrum.

In addition, a station-based or central processing method may be advantageously used in practicing the invention.

B. Location of Broadband OFDM Transmitters with TDOA, Using Only a Portion of the Transmitted Spectrum Broadband wireless communication infrastructure is being deployed and used on a large scale basis. WiFi capable devices, as defined in IEEE 802.11 G, are capable communicating at rate of 54 mbps using a signal bandwidth on the order of 20 MHz. WiMAX capable devices as defined in IEEE 802.16 will be capable of communicating at rate of 75 mbps, with signal bandwidth on the order of 20 MHz. This broadband capability will allow higher throughput applications to be used by wireless devices. Robust location techniques such as U-TDOA are needed for these mobile devices for emergency and other location based services.

Orthogonal frequency-division multiplexing (OFDM), also sometimes called discrete multitone modulation (DMT), is based upon the principle of frequency-division multiplexing (FDM), but is often used as a digital modulation scheme. The bit stream that is to be transmitted is split into several parallel bit streams, typically dozens to thousands, and the available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross-talk between the sub-channels is eliminated. Channel equalization is simplified by using many slowly modulated narrow-band signals instead of one rapidly modulated wideband signal. An advantage of OFDM is its ability to cope with severe channel conditions, such as multipath and narrowband interference, without complex equalization filters. As mentioned, OFDM has developed into a popular scheme for wideband digital communication systems.

In OFDM, the sub-carrier frequencies are chosen so that the modulated data streams are orthogonal to each other, meaning that cross-talk between the sub-channels is eliminated and inter-carrier guard bands are not required. This greatly simplifies the design of both the transmitter and the receiver without a separate filter for each sub-channel, which is required in conventional FDM. The orthogonality also allows high spectral efficiency, near the Nyquist rate. The orthogonality also allows for efficient modulator and demodulator implementation using the FFT algorithm. Although the principles and some of the benefits have been known since the 1960s, OFDM is made popular today for wideband communication by availability of low-cost digital signal processing components that can efficiently calculate the FFT. OFDM requires accurate frequency synchronization in the receiver; any inaccuracy means that the sub-carriers no longer appear orthogonal, resulting in degraded performance.

U-TDOA location of devices transmitting these signals becomes a challenge, as receivers are needed to capture very high bandwidth signals, store and process them. The requirements for RF signal bandwidth, digital signal processing power, and memory required to perform U-TDOA location on a signal with a 20 MHz bandwidth signal can be six times that required to locate third generation (3G) wireless devices utilizing signals with a bandwidth of 3 to 5 MHz. These increased requirements can dramatically increase the cost and complexity of the Signal Collection System or LMU (the terms SCS and LMU will be used interchangeably herein).

With an embodiment of the present invention, TDOA location of a broadband wireless transmitter is accomplished by selecting only a portion of the spectrum of the transmitted signal, which can be supported by the available capability of the SCSs measuring the signal. The capability includes the level of receiver bandwidth, signal sampling rate, DSP processing throughput, and memory. As an example, a SCS may be equipped with an RF receiver containing filters with sufficient bandwidth to support a 3GPP UMTS waveform (3-5 MHz bandwidth), analog to digital converters capable of sampling a 3-5 MHz wide signal, and digital signal processing resources and memory capable of performing TDOA location processing of a signal with 3-5 MHz of bandwidth, but with the SCS incapable of collecting and processing a full 20 MHz bandwidth signal. In this case, a contiguous portion of the transmitted signal may be selected, with this portion having a signal bandwidth that is within the capabilities of the SCS. This signal reduction is possible because the OFDM waveform transmitted by a broadband device actually consists of many (256 for example) contiguous channels, which can be individually demodulated and separated from the rest of the signal. A block of 64 channels, which might be selected to be a power of 2 for FFT efficiency, may be processed in the TDOA location computation. In a direct sequence spread spectrum system such as IS-95, or UMTS, this would not be possible, as there would be no way to extract any meaningful data from a small portion of the transmitted signal. A small portion of the spectrum could not be demodulated without the rest of the signal as in an OFDM waveform. Because these are high bandwidth signals, a station-based process as defined in the '144 patent could be used as this minimizes the amount of data transferred, although signal data could be transferred to a central node for central correlation processing, as also described in the '144 patent. This technique applies to both wideband and narrowband embodiments of the SCS.

The transmitted waveform used in the IEEE 802.16 WiMAX system consists of 256 channels. The outer 55 channels are guard channels in which minimal energy is transmitted. In addition, there are 8 pilot channels to aid in signal acquisition and demodulation. Selection of the bandwidth to process should include a number of pilot channels which are placed through the full channel set to help the receiver properly detect and demodulate the signal. In addition, the guard signals are good candidates to exclude as they contain little useful signal energy. The channel set selection could also be based upon knowledge of the current utilization of the spectrum, where less utilized spectrum is chosen for processing to minimize the likelihood of interference. The selected channel set may also be chosen to be a power of 2 or 4 to allow for efficient multiplexing with an FFT.

Figure 1:
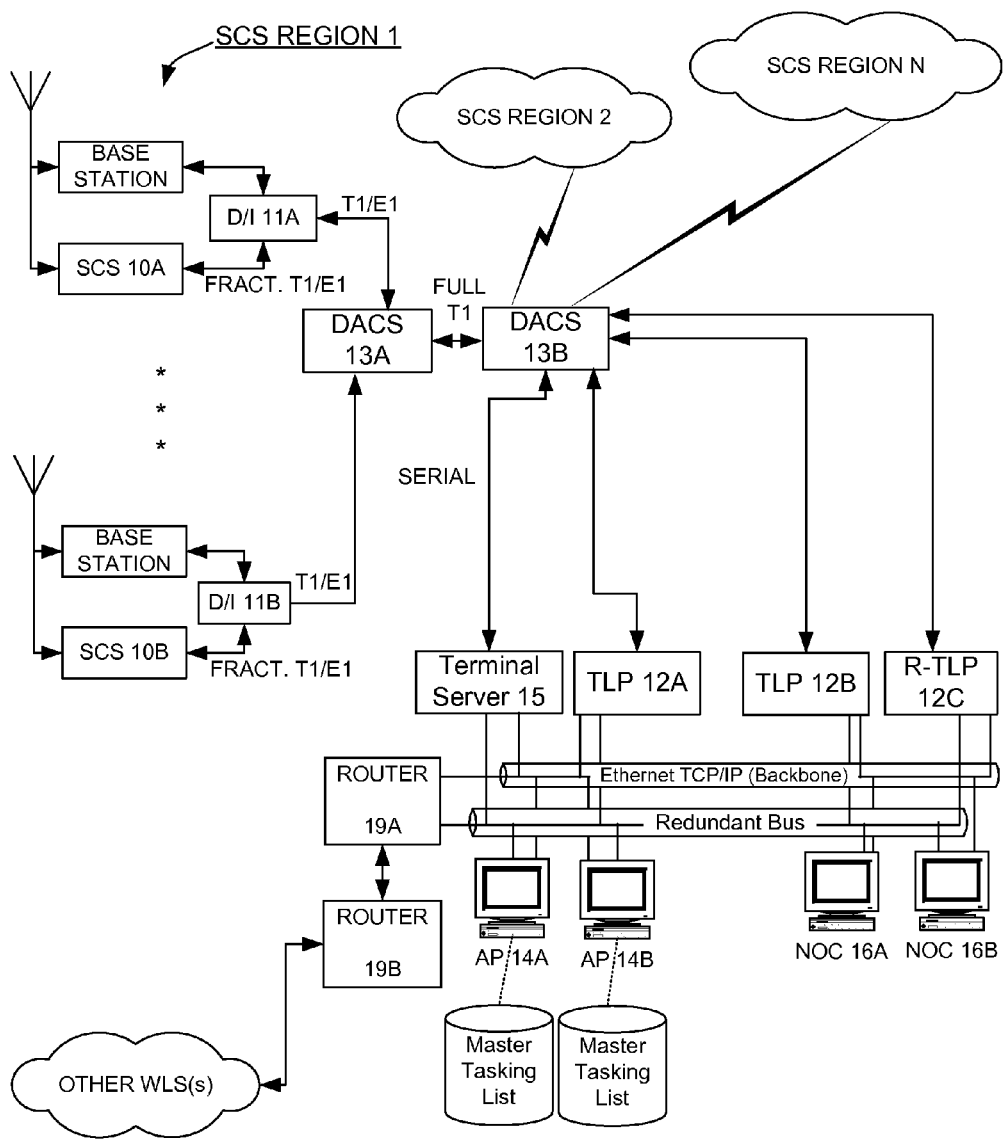
FIG. 1 schematically depicts a Wireless Location System.
Figure 2A:
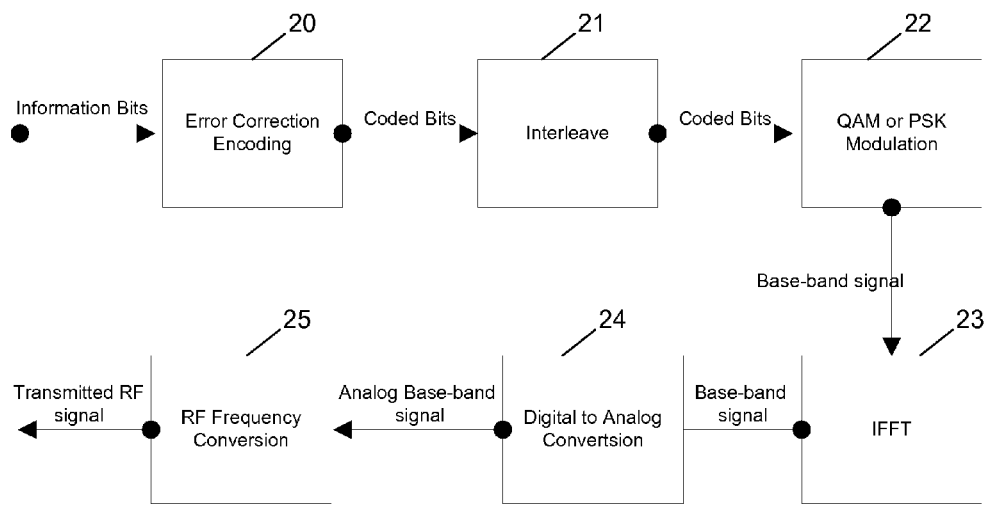
FIGS. 2A and 2B are block diagrams of the signal processing in OFDM transmitters and receivers, respectively.

A transmitted OFDM waveform is typically constructed as shown in FIG. 2A. The process may be summarized as follows:

1. Information bits are encoded with additional redundant and parity bits to allow the receiver to detect and correct errors. (Reference numeral 20.)
2. Data are interleaved to distribute the redundant bits over a larger time to allow the redundancy in the error correction codes to correct short degradations in received signal quality. (Reference numeral 21.)
3. The encoded bits are modulated into PSK or QAM symbols, in the form of base-band sample data. (Reference numeral 22.)
4. A block of PSK or QAM symbols (256) are passed through an inverse Fast Fourier Transform (IFFT) creating the OFDM signal. (Reference numeral 23.)
5. The digital signal is then converted to analog with a digital to analog converter. (Reference numeral 24.)
6. The signal is frequency converted to Radio Frequency (RF) and then it is transmitted. (Reference numeral 25.)

Figure 2B:
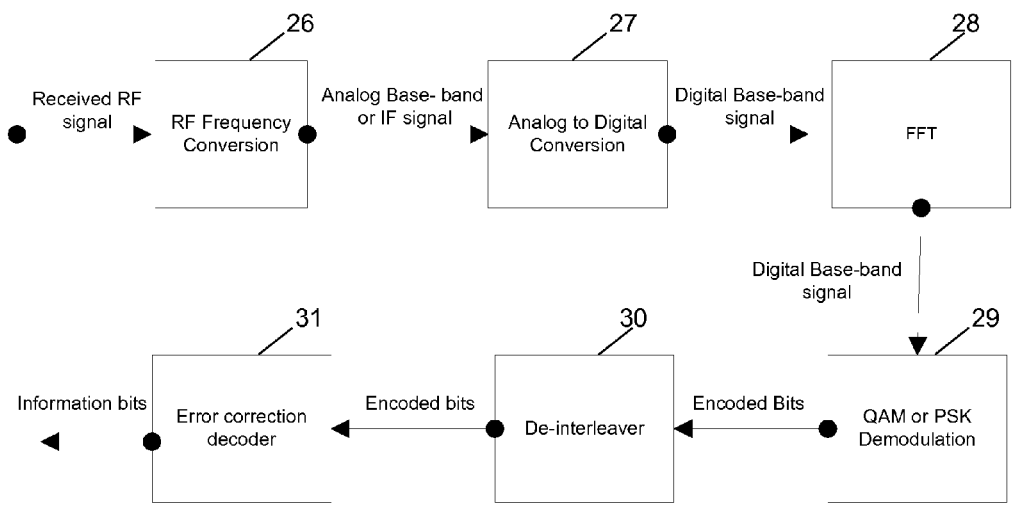

A typical OFDM receiver performs the following steps shown in FIG. 2B. This process is essentially the reverse of the transmitter process:

1. RF signal is frequency converted to base-band, filtered, and digitized. (Reference numerals 26 and 27.) This may include:
    a. One more stages of frequency conversion of the analog signal to and intermediate frequency (IF), or base-band;
    b. Filtering of the analog signal to a bandwidth which satisfies the Nyquist criteria for the signal bandwidth, and sample rate;
    c. Digitizing base-band or IF signal with an analog to digital converter;
    d. Digital down-conversion of IF to base-band if necessary; and e. Possible additional digital filtering, and decimation to a lower sample rate.
2. Receiver performs an FFT of a block (256) of samples, which converts the OFDM signal into a single channel high data rate signal. (Reference numeral 28.)
3. Receiver demodulates PSK or QAM signals and outputs coded bits. (Reference numeral 29.)
4. Signal is de-interleaved. (Reference numeral 30.)
5. Encoded bits are decoded, providing original information bits. (Reference numeral 31.)

Figure 3:
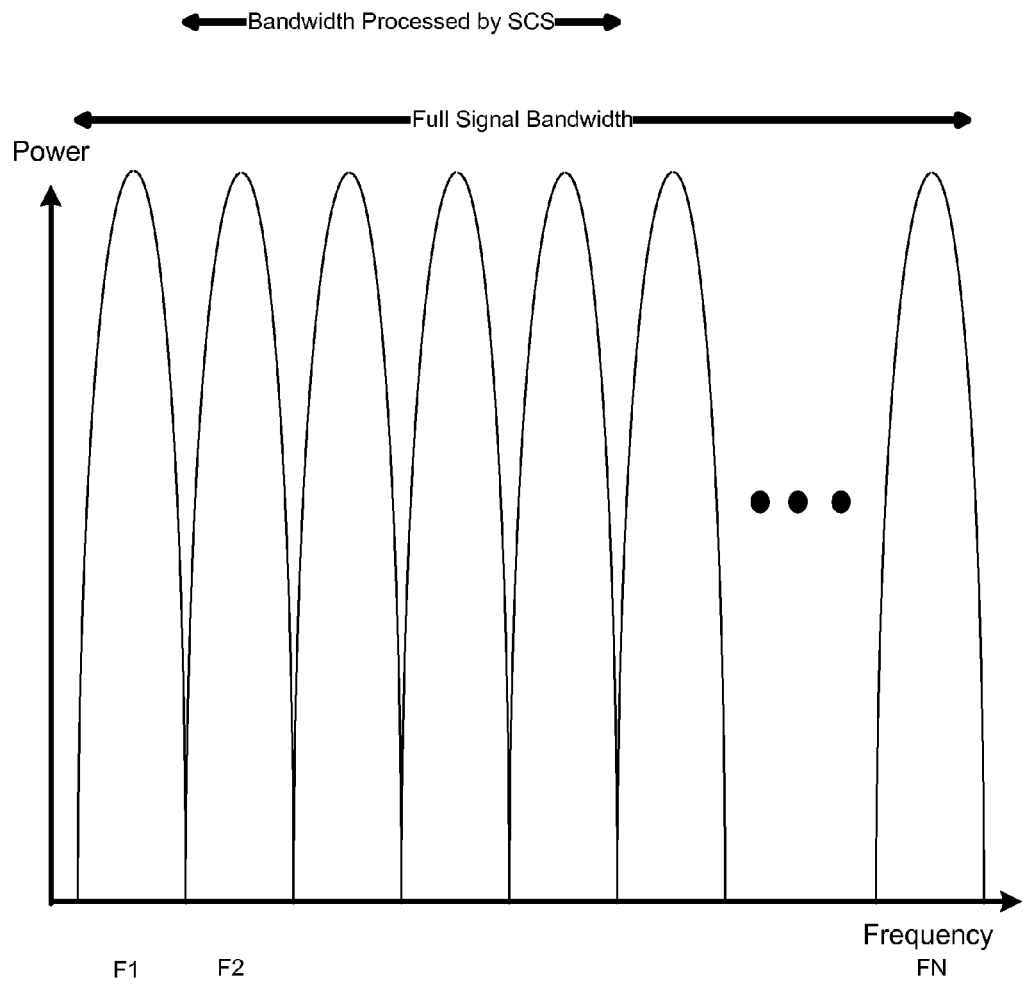
FIG. 3 illustrates a reduced spectrum processed by a SCS or LMU as compared with the entire spectrum transmitted.

FIG. 3 shows how only a portion of the transmitted channels of an OFDM signal is selected for location processing.

Figure 4:
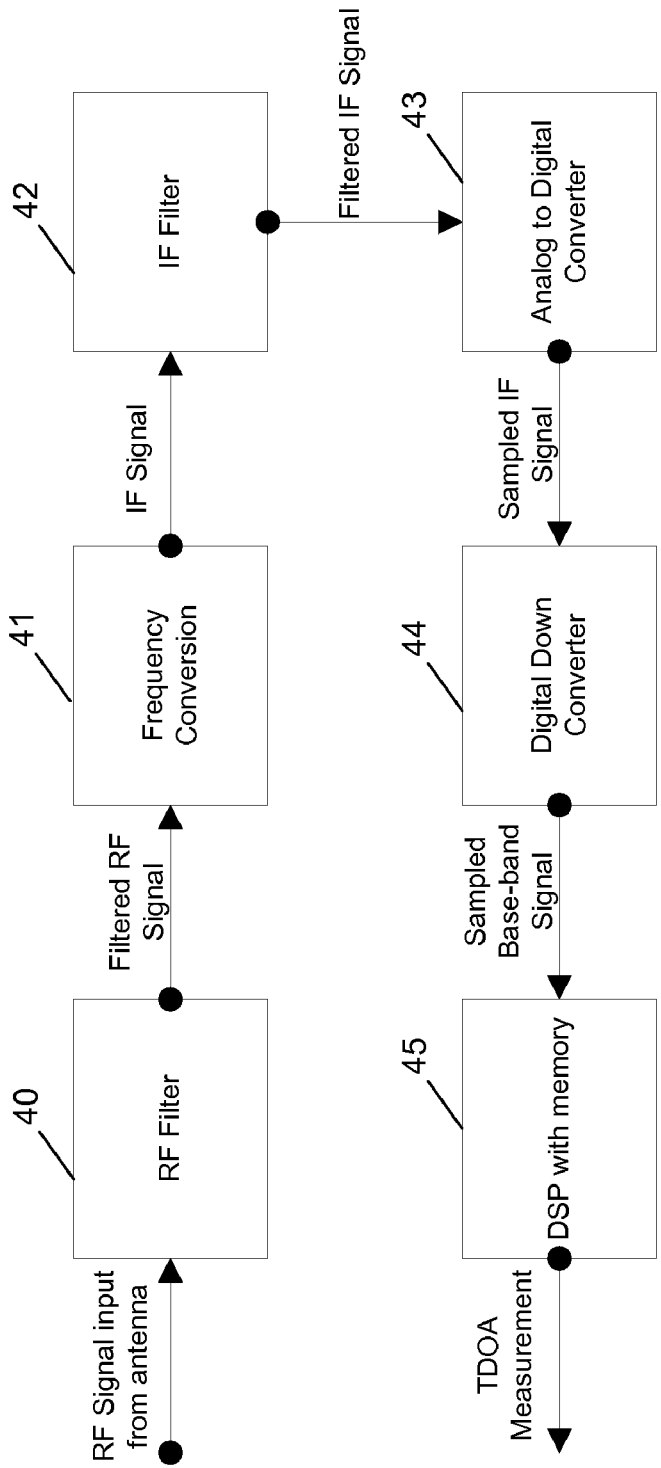
FIG. 4 schematically depicts an exemplary signal processing chain employed by the SCSs of an illustrative embodiment.

FIG. 4 shows the signal processing chain of the SCS. In an illustrative example of the present invention, the SCS has RF signals from antennas connected to the input. These RF signals may contain some undesired out of band signals from the base station transmitter, or other interferers. The RF filter 40 reduces the levels of the undesired signals outside of the pass-band of the desired signals, while allowing the pass-band signals to pass to the next stage with minimal loss. The filtered RF signal is then frequency converted 41 to an IF frequency of around 70 MHz. The frequency conversion process is accomplished by modulating the RF signal with a sinusoidal Local Oscillator (LO) signal with a frequency about 70 MHz lower than the desired RF frequency. This will cause the RF signal to be translated to frequency around 70 Hz. Adjusting the LO frequency will allow different portions of the LO frequency to be tuned around 70 MHz. In this case the desired portion of the receiver RF signal will be tuned to a center frequency of 70 MHz.

The IF signal is then passed through an IF filter 42 to reduce the bandwidth of the signal such that it can easily be sampled at a rate meeting the Nyquist criteria to avoid aliasing. The IF filter 42 has a pass-band of 5 MHz and a center frequency of 70 MHz. The filter, which could be made up of one or more cascaded surface acoustic wave (SAW) filters, reduces the power level of all signals outside of a 10 MHz bandwidth by 75 dB, relative to the pass-band level. A filter of this type is selected because many transceivers are designed with a 70 MHz IF frequency, and filters with a 5 MHz pass-band are commonly used in WCDMA and cable TV equipment. These filters are inexpensive and readily available. Passing a wider bandwidth of 20 MHz would likely require a custom filter design, and increase the SCS cost. The filtered IF signal is then sampled by the analog to digital converter 43, with a sample rate of 60 MSPS. A high sampling rate permits the use of digital down converters with output signal sample rates of ~12 MSPS. The digitized signal is then passed through a digital down converter 44, where the digital signal is filtered to a bandwidth of <5 MHz, and converted from IF to base-band. In this process the sample rate is also decimated to 12 MSPS. The decimation eliminates the redundant samples, reducing the processing load on the DSP 45.

The largest savings from reducing the processes spectrum is in memory and DSP processing throughput. The required memory and DSP throughput can be compared when performing a TDOA measurement on the full 20 MHz signal, which would have a sample rate of 48 MHz vs. a 5 MHz portion of the signal, with a sample rate of 12 MHz. TDOA measurements are made by performing a cross correlation of the signal received by one SCS with a reference signal received at another SCS, as a function of time difference, as shown below.

$$y(\tau) = \sum_N x(\tau) r(n + \tau)$$

where x(n) is the received signal, r(n) is the reference signal, and N is the number of samples in both the received and reference signals.

Both the size of memory required to store the signal, as well as the number of multiplications to perform the correlation are a linear function of the number of samples. If one second of received and reference data are to be used for correlation, the full signal would require the storage of 48 million samples, and 48 million multiplications to compute a single cross-correlation value. The reduced signal would require storage of 12 million samples, and 12 million multiplications to compute a single correlation value. The reduced signal requires only ¼ the memory and DSP 45 power as the full signal.

Figure 5:
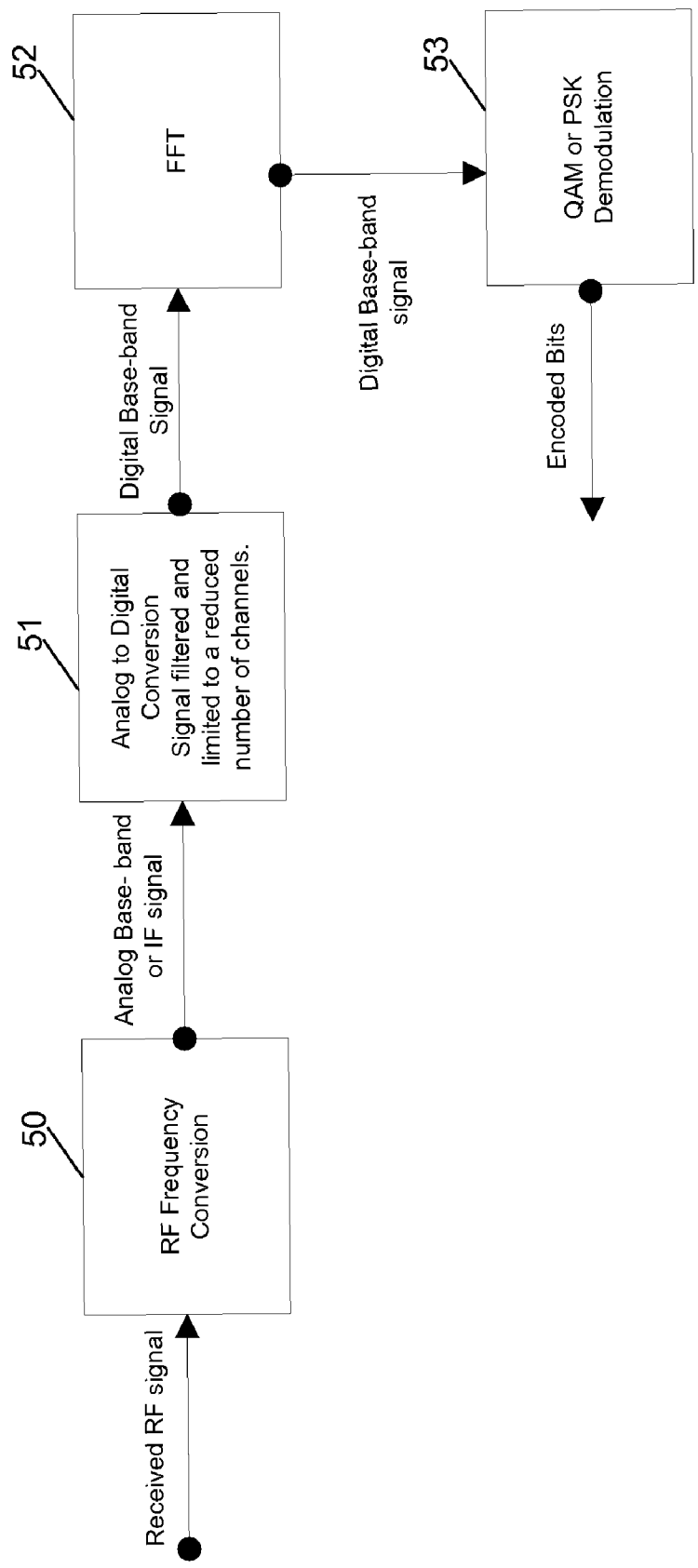
FIG. 5 is a block diagram of a modified signal processing chain employed to support a reduced signal bandwidth.

FIG. 5 shows the demodulation and decoding by the primary SCS in a station-based processing implementation. Because much of the underlying data is missing due to the reduction in processed spectrum, the steps of interleaving and decoding are not feasible, and are eliminated, further reducing required processing.
1. RF signal is frequency converted to base-band, filtered, and digitized. (Reference numerals 50 and 51.) This may include:
    a. One more stages of frequency conversion of the analog signal to and intermediate frequency (IF), or base-band;
    b. Filtering of the analog signal to a bandwidth which satisfies the Nyquist criteria for the signal bandwidth, and sample rate,
        i. The sample rate is be much lower than the 48 MHz required to properly sample a 20 MHz signal;
        ii. The filter bandwidth could be much less than the 20 MHz required to pass an entire signal;
    c. Digitizing base-band or IF signal with an analog to digital converter;
    d. Digital down-conversion of IF to base-band if necessary;
    e. Possible additional digital filtering, and decimation to a lower sample rate;
2. FFT performed on of a block (64) of samples. (Reference numeral 52.)
3. PSK or QAM signals demodulated to coded bits. (Reference numeral 53.)

Figure 6:
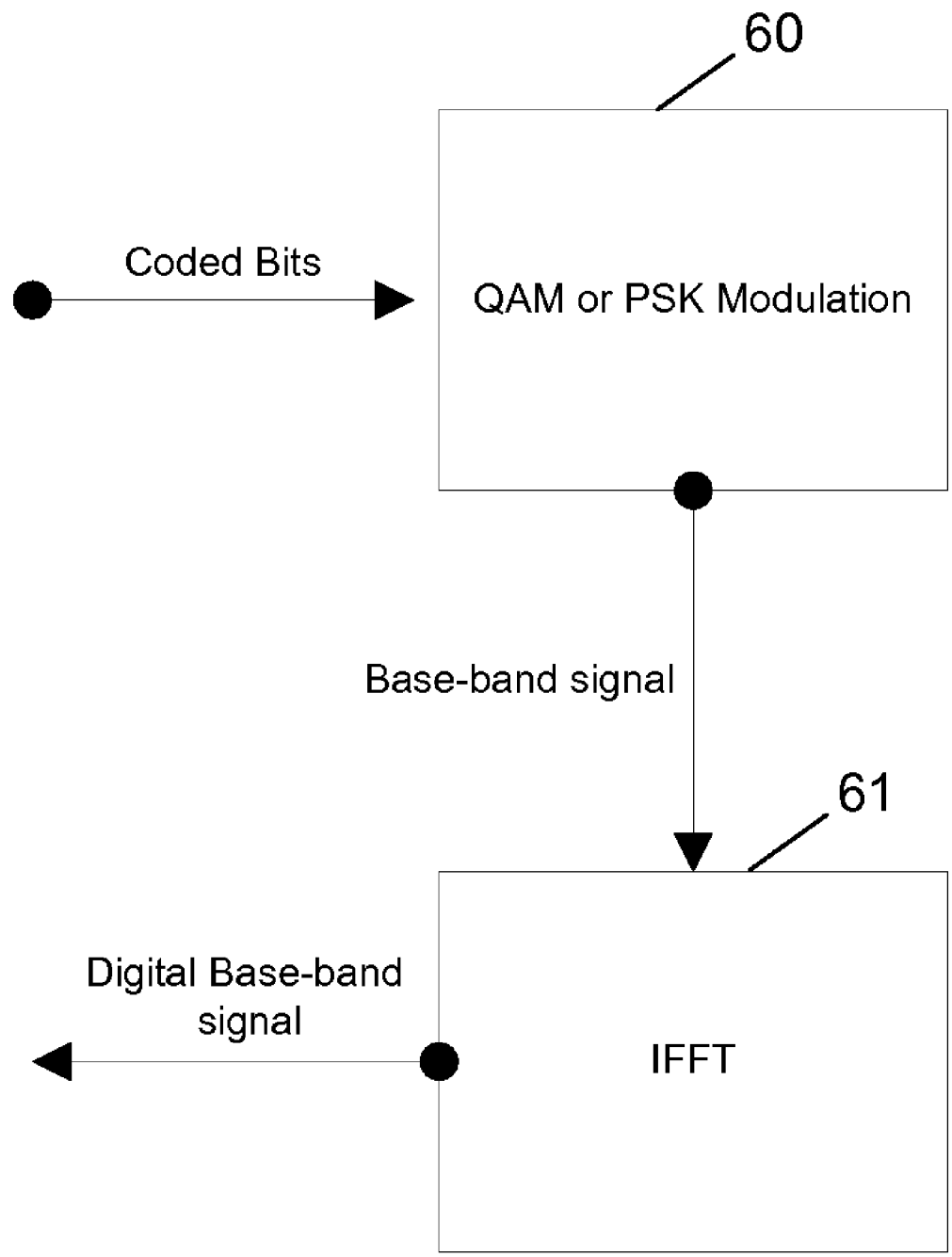
FIG. 6 is a block diagram of a reconstruction process for the reduced signal.

The reconstruction process used for the reduced signal is shown in FIG. 6.
1. The encoded bits are modulated into PSK or QAM symbols, in the form of base-band sample data. (Reference numeral 60.)
2. A block of PSK or QAM symbols (256) are passed through an inverse Fast Fourier Transform (IFFT) creating the OFDM signal. (Reference numeral 61.)
3. Additional characteristics are applied to the signal, such as phase corrections. (Not shown.)

Figure 7:
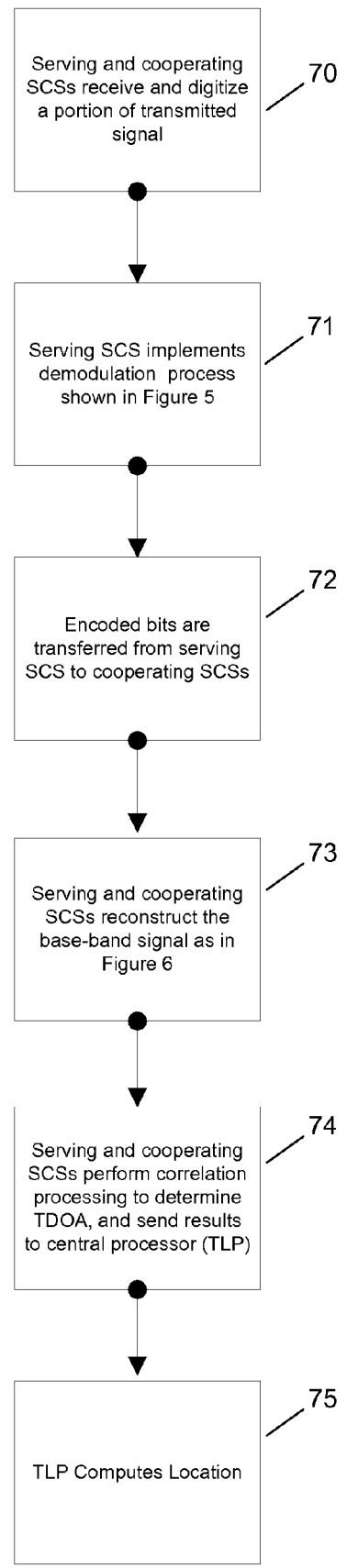
FIG. 7 is a flowchart of a station-based location process for the reduced signal.

Therefore, the station-based TDOA location process for the reduced waveform would be as shown in FIG. 7:
1. The primary SCS, as well as cooperating SCSs receive and digitize the transmitted signal (reference numeral 70):
    a. Sampling of the receive signals is synchronized to facilitate TDOA processing.

b. Sampled signal bandwidth and sample rate may be reduced, as only a fraction of the signal bandwidth will be processed.
2. The primary SCS implements the demodulation steps above, which excludes de-interleaving and error correction decoding, and also measures other signal characteristics, such as phase corrections. (Reference numeral 71.)
3. Encoded bits and characteristic data is transferred to cooperating SCSs. (Reference numeral 72.)
4. Primary and cooperating SCSs reconstruct the reference base-band signal, by implementing the steps shown in FIG. 6. (Reference numeral 73.)
5. Primary and cooperating SCSs perform correlation processing to measure the Time Difference of Arrival of the signal, and send the TDOA measurement to the TLP. (Reference numeral 74.)
6. TLP computes the location. (Reference numeral 75.)

The concepts described herein are not limited to WiFi or WiMAX systems, but apply to any system which uses OFDM for communication. The invention is not limited to the specific architecture and/or implementation defined for the SCS.

Alternate Embodiments

Figure 9:
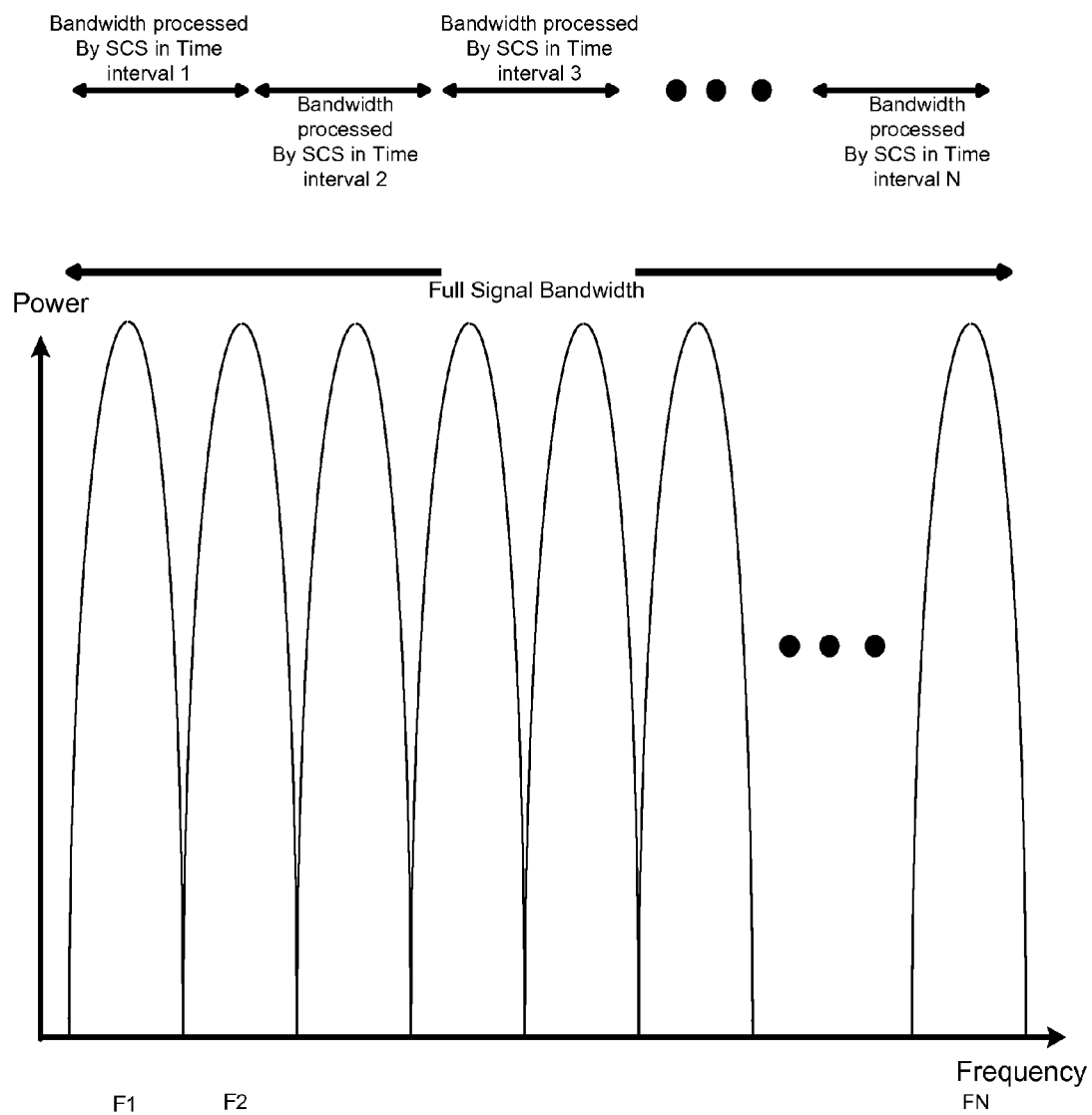
FIG. 9 illustrates the full bandwidth of an OFDM waveform with small slices processed at any one time by an SCS/LMU, with multiple time intervals used to cover most or all of the OFDM waveform bandwidth.

An extension to the above approach allows the use of a narrower-band front end to capture just a portion of the OFDM waveform spectrum as described above, while maintaining the improved multi-path resolution that can be achieved using the wider-band waveform that is transmitted by the mobile device. This extension involves sampling a portion of the OFDM waveform spectrum as described above for a interval of time, then re-tuning the frequency agile receiver to sample a different portion of the OFDM waveform spectrum in the next interval of time, then continuing this process to get multiple slices of the OFDM waveform spectrum (up to covering the entire OFDM waveform spectrum with a series of narrow-band samples). This re-tuning can be performed in sequential or random patterns to cover most or all of the OFDM waveform bandwidth. This is illustrated in FIG. 9. (See also, U.S. Pat. No. 6,646,604, Nov. 11, 2003, "Automatic Synchronous Tuning of Narrowband Receivers of a Wireless Location System for Voice/Traffic Channel Tracking," which is hereby incorporated by reference in its entirety.)

Figure 8A:
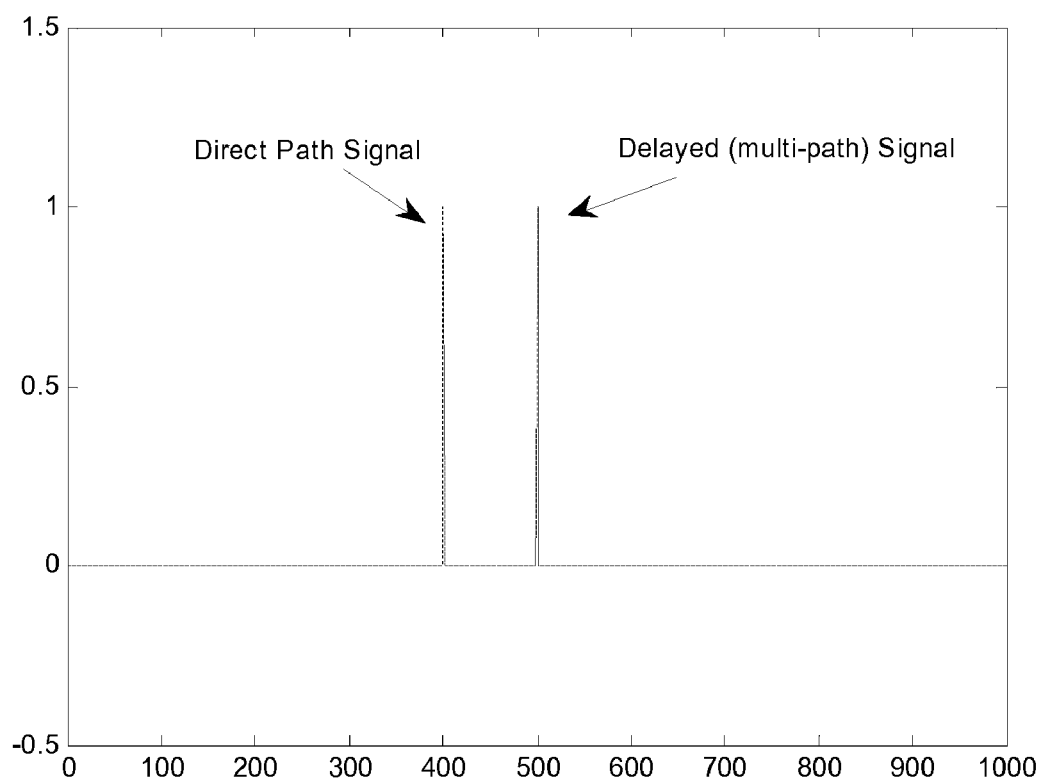
FIG. 8A depicts an ideal cross-correlation function showing peaks due to two signal components, a direct path component and a delayed component due to a multi-path reflection.
Figure 8B:
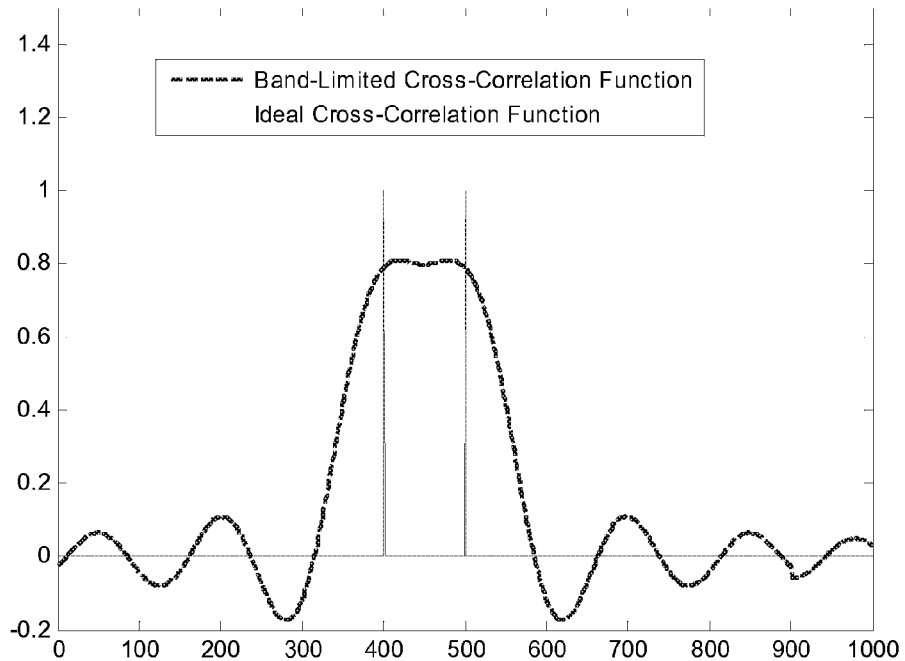
FIG. 8B depicts an ideal cross-correlation function (solid line) showing peaks due to two signal components and a band-limited cross-correlation function showing the smearing of those peaks that make them indistinguishable.
Figure 8C:
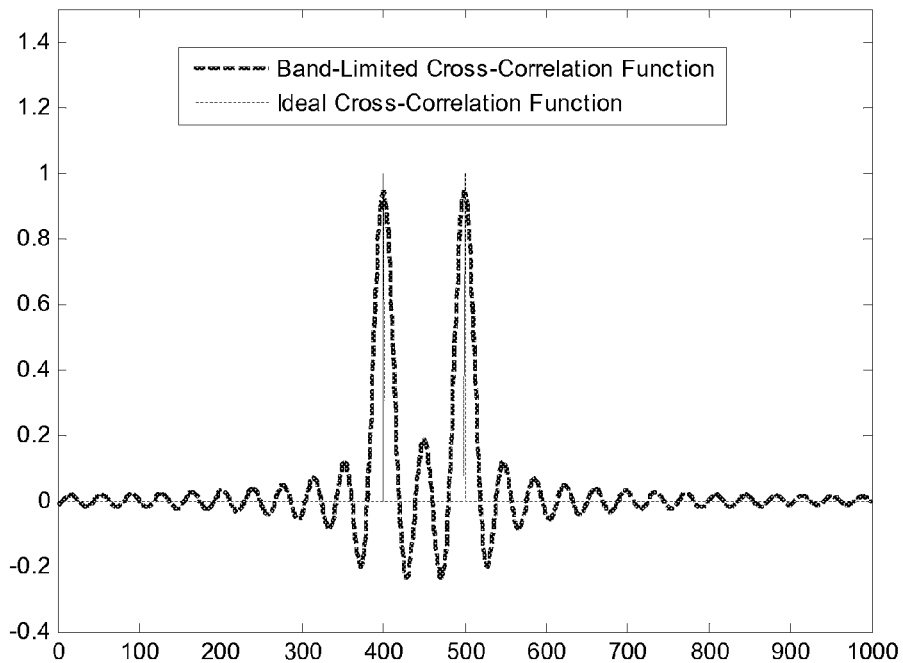
FIG. 8C depicts an ideal cross-correlation function (solid line) showing peaks due to two signal components and a band-limited cross-correlation function, with 4× the bandwidth of the function shown in FIG. 8B, still showing some smearing, but the increased bandwidth makes two individual peaks distinguishable.

The ability to resolve multi-path components in the cross-correlation function used to measure TDOA values is limited by the bandwidth of the signal that is used. When there is a direct path signal and a delayed signal that arrives in close proximity in time, an ideal correlation function using infinite bandwidth signals would result in two peaks that are easily resolvable as shown in FIG. 8A. When band limited signals are used to generate the cross-correlation function, these peaks are "smeared" by a smoothing function whose width is proportional to the inverse of the bandwidth of the signal. When this inverse bandwidth is wider then the separation between the arriving signals, they become indistinguishable as shown in FIG. 8B. If, however, this inverse bandwidth is narrower then the separation between the arriving signals, then the peaks in the correlation function, while still smeared, can be easily distinguished, as shown in FIG. 8C, where the bandwidth is 4 times that of the signal in FIG. 8B. The ability to distinguish the different signal arrivals allows the selection of the direct path signal. This provides a more accurate TDOA measurement, directly reducing error of the location estimate.

This advantage of a wider bandwidth cross-correlation function can be achieved without the added cost of sampling the full bandwidth simultaneously, which would require a wider-band front receiver, higher sample rate A/D converter, more storage, and processing power. Instead, a series of narrow-band samples can be stored, and the advantage of the wider bandwidth cross-correlation function can be achieved using the bandwidth synthesis process described in U.S. Pat. No. 6,091,362, Jul. 18, 2000, "Bandwidth Synthesis for Wireless Location System," which is hereby incorporated by reference in its entirety.

In frequency hopped waveforms such as GSM, the advantage gained by performing bandwidth synthesis can be somewhat limited by the fact that the spacing of the sampled frequency is not contiguous in general, and can be quite sparse in practice. This sparse spacing results in ambiguities in the synthesized cross-correlation function that may not be successfully resolved. In this embodiment, the OFDM waveform occupies a large contiguous block of spectrum which is sampled using a series of narrower slices of the spectrum. This insures that the slices will be adjacent to each other in frequency (see FIG. 9), allowing the bandwidth synthesis process to produce a synthesized cross-correlation function that does not contain ambiguities.

C. Conclusion

The true scope the present invention is not limited to the presently preferred embodiments disclosed herein. For example, the foregoing disclosure of a presently preferred embodiment of a Wireless Location System uses explanatory terms, such as Signal Collection System (SCS), TDOA Location Processor (TLP), Applications Processor (AP), Location Measuring Unit (LMU), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the invention is not limited to systems employing SCS's constructed as described above. The SCS's, TLP's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the TLP) described herein to another functional element (such as the SCS) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A system for locating wireless transmitters employing an Orthogonal Frequency Division Multiplexing (OFDM) digital modulation scheme, wherein said OFDM scheme comprises transmitting signal components over a plurality of narrowband frequency channels spanning a wideband channel, comprising:
a first receiving system configured to receive a fraction of the signal components transmitted by a first wireless transmitter to be located in a fraction of the narrowband frequency channels, and to process said fraction of the signal components to derive location related measurements, wherein said fraction of the narrowband frequency channels includes at least one pilot channel in which said first wireless transmitter transmits energy, and wherein the first receiving system is configured to use signal components in said pilot channel to aid in signal acquisition and demodulation; wherein said first receiving system comprises a first frequency conversion circuit configured to convert a first received RF signal component to a first digital baseband OFDM signal; a Fast Fourier Transform (FFT) circuit configured to perform an FFT of the first digital baseband OFDM signal provided by the first frequency conversion circuit; a demodulation circuit configured to produce coded bits based on the output of the FFT circuit; a first reconstruction circuit configured to reconstruct the first digital baseband OFDM signal based on the coded bits produced by the demodulation circuit; and a first correlation processing system configured to correlate the first reconstructed digital baseband OFDM signal with the first digital baseband OFDM signal, wherein a correlation function peak is indicative of a first time of arrival for the first received RF signal component;

a second receiving system configured to receive said fraction of the signal components transmitted by said first wireless transmitter, and to process said fraction of the signal components to derive location related measurements, wherein the second receiving system is configured to use signal components in said pilot channel to aid in signal acquisition and demodulation; wherein said second receiving system comprises a second reconstruction circuit configured to receive the coded bits produced by the first demodulation circuit of the first receiving system and to produce the first reconstructed digital baseband OFDM signal; and a second correlation processing system configured to correlate the first reconstructed digital baseband OFDM signal with a second digital baseband OFDM signal derived by the second receiving system, wherein a peak of the correlation function is indicative of a second time of arrival for the RF signal as received at the second receiving system; and a processing system, operatively coupled to said first and second receiving systems, wherein said processing system is configured to use location related measurements from said first and second receiving systems, including the first and second times of arrival, to compute the location of said first wireless transmitter.

2. A system as recited in claim 1, wherein said location related measurements derived by said first and second receiving systems comprise time difference of arrival (TDOA) measurements.

3. A system as recited in claim 1, wherein said location related measurements derived by said first and second receiving systems comprise time of arrival (TOA) measurements.

4. A system as recited in claim 1, wherein said location related measurements derived by said first and second receiving systems comprise angle of arrival (AOA) measurements.

5. A system as recited in claim 1, wherein said location related measurements derived by said first and second receiving systems comprise round trip time measurements.

6. A system as recited in claim 1, wherein said location related measurements derived by said first and second receiving systems comprise received power measurements.

7. A system as recited in claim 1, wherein said fraction of the predefined narrowband frequency channels excludes guard channels in which said first wireless transmitter transmits minimal energy.

8. A system as recited in claim 1, wherein said first and second receiving systems each include a radio frequency (RF) filter, and wherein the first and second receiving systems are each configured to receive signal components within a bandwidth compatible with said RF filter.

9. A system as recited in claim 1, wherein said first and second receiving systems each include an intermediate frequency (IF) filter, and wherein the first and second receiving systems are each configured to receive signal components within a bandwidth compatible with said IF filter.

10. A system as recited in claim 1, wherein said first and second receiving systems each include an analog to digital converter (ADC) characterized by a sample rate, and wherein the first and second receiving systems are each configured to receive signal components within a bandwidth compatible with said sample rate.

11. A system as recited in claim 10, wherein said ADCs are further characterized by a sample rate after decimation, and wherein the first and second receiving systems are configured to receive signal components within a bandwidth compatible with said sample rate after decimation.

12. A system as recited in claim 1, wherein said first and second receiving systems each include available memory for storing data representing received signal components, and wherein said first and second receiving systems are configured to receive signal components within a bandwidth compatible with said available memory.

13. A system as recited in claim 1, wherein said first and second receiving systems each include digital signal processors (DSPs) characterized by DSP processing throughput, and wherein said first and second receiving systems are configured to receive signal components within a bandwidth compatible with said DSP processing throughput.

14. A system as recited in claim 1, wherein said first and second receiving systems are configured to receive signal components within a bandwidth compatible with a current load on the receiving system.

15. A system as recited in claim 1, wherein said first and second receiving systems are configured to tune to a plurality of channels to receive signals from a plurality of wireless transmitters to be located.

16. A system as recited in claim 1, wherein said first and second receiving systems are configured to tune to a plurality of selected channels, wherein said selected channels are determined based upon interference levels.

17. A system as recited in claim 16, wherein said selected channels are determined based upon measurements of received signals.

18. A system as recited in claim 16, wherein said selected channels are determined based upon spectrum usage.

19. A system as recited in claim 1, wherein said first and second receiving systems are configured for collection of multiple slices of spectrum for bandwidth synthesis.

20. A system as recited in claim 1, wherein said first and second receiving systems are configured for use of a sequential pattern of re-tuning a frequency agile receiver to cover a substantial part of an OFDM waveform spectrum.

21. A system as recited in claim 1, wherein said system is configured for use of a bandwidth synthesis process to provide increased resolution in a cross-correlation function to reduce multipath delay spread.

22. A system as recited in claim 1, wherein said system is configured to use a station-based processing method.

23. A system as recited in claim 1, wherein said first or second receiving systems include means for performing OFDM receiving and demodulation processing.

24. A system as recited in claim 1, wherein said first and second receiving systems include narrowband receivers.

25. A system as recited in claim 1, wherein said first and second receiving systems include wideband receivers.

26. A method for locating wireless transmitters employing an Orthogonal Frequency Division Multiplexing (OFDM) digital modulation scheme, wherein said OFDM scheme comprises transmitting signal components over a plurality of narrowband frequency channels spanning a wideband channel, comprising:
   at a first receiving system, receiving a fraction of the signal components transmitted by a first wireless transmitter to be located in a fraction of the narrowband frequency channels, and processing said fraction of the signal components to derive location related measurements including a first time of arrival for a first received RF signal component;
   wherein the processing at the first receiving system comprises:
      converting the first received RF signal component to a first digital baseband OFDM signal;
      performing a Fast Fourier Transform (FFT) of the first digital baseband OFDM signal provided by the first frequency conversion circuit
      producing coded bits based on the output of the FFT circuit;
      reconstructing the first digital baseband OFDM signal based on the coded bits; and
      correlating the reconstructed first digital baseband OFDM signal with the first digital baseband OFDM signal, wherein a correlation function peak is indicative of the first time of arrival for the first received RF signal component;
   at a second receiving system which is geographically separated from said first receiving system, receiving said fraction of the signal components transmitted by said first wireless transmitter, and processing said fraction of the signal components to derive location related measurements including a second time of arrival for the RF signal as received at the second receiving system;
   wherein the processing at the second receiving system comprises:
      receiving the coded bits produced by the first receiving system and producing the first reconstructed digital baseband OFDM signal; and
      correlating the first reconstructed digital baseband OFDM signal with a second digital baseband OFDM signal derived by the second receiving system, wherein a peak of the correlation function is indicative of a second time of arrival for the RF signal as received at the second receiving system; and
   processing said location related measurements from said first and second receiving systems to compute the location of said wireless transmitter;
   wherein said fraction of the narrowband frequency channels includes at least one pilot channel in which said first wireless transmitter transmits energy, and wherein the first and second receiving systems use signal components in the pilot channel for signal acquisition and demodulation.

27. A method as recited in claim 26, wherein said location related measurements comprise time difference of arrival (TDOA) measurements.

28. A method as recited in claim 26, wherein said location related measurements comprise time of arrival (TOA) measurements.

29. A method as recited in claim 26, wherein said location related measurements comprise angle of arrival (AOA) measurements.

30. A method as recited in claim 26, wherein said location related measurements comprise round trip time measurements.

31. A method as recited in claim 26, wherein said location related measurements comprise received power measurements.

32. A method as recited in claim 26, wherein signal components in said pilot channel are used to aid in signal acquisition and demodulation.

33. A method as recited in claim 26, wherein said fraction of the narrowband frequency channels excludes guard channels in which said first wireless transmitter transmits minimal energy.

34. A method as recited in claim 26, wherein said first and second receiving systems each include a radio frequency (RF) filter, and wherein the method includes receiving signal components within a bandwidth compatible with said RF filter.

35. A method as recited in claim 26, wherein said first and second receiving systems each include an intermediate frequency (IF) filter, and wherein the method includes receiving signal components within a bandwidth compatible with said IF filter.

36. A method as recited in claim 26, wherein said first and second receiving systems each include an analog to digital converter (ADC) characterized by a sample rate, and wherein the method includes receiving signal components within a bandwidth compatible with said sample rate.

37. A method as recited in claim 36, wherein said ADCs are further characterized by a sample rate after decimation, and wherein the method includes receiving signal components within a bandwidth compatible with said sample rate after decimation.

38. A method as recited in claim 26, wherein said first and second receiving systems each include available memory for storing data representing received signal components, and wherein the method includes receiving signal components within a bandwidth compatible with said available memory.

39. A method as recited in claim 26, wherein said first and second receiving systems each include digital signal processors (DSPs) characterized by DSP processing throughput, and wherein the method includes receiving signal components within a bandwidth compatible with said DSP processing throughput.

40. A method as recited in claim 26, wherein the method includes, at the first receiving system, receiving signal components within a bandwidth compatible with a current load on the first receiving system.

41. A method as recited in claim 26, wherein the method includes, at the first and second receiving systems, tuning to a plurality of channels to receive signals from a plurality of wireless transmitters to be located.

42. A method as recited in claim 26, wherein the method includes, at the first and second receiving systems, tuning to a plurality of selected channels, wherein said selected channels are determined based upon interference levels.

43. A method as recited in claim 42, wherein said selected channels are determined based upon measurements of received signals.

44. A method as recited in claim 42, wherein said selected channels are determined based upon spectrum usage.

45. A method as recited in claim 26, wherein the method further comprises, at the first and second receiving systems, collection of multiple slices of spectrum for bandwidth synthesis.

46. A method as recited in claim 26, wherein the method further comprises, at the first and second receiving systems, use of a sequential pattern of re-tuning a frequency agile receiver to cover a substantial part of an OFDM waveform spectrum.

47. A method as recited in claim 26, wherein the method further comprises, at the first and second receiving systems, use of a bandwidth synthesis process to provide increased resolution in a cross-correlation function to reduce multipath delay spread.

48. A method as recited in claim 26, further comprising the use a station-based processing method.

49. A method as recited in claim 26, wherein the method further comprises, at the first or second receiving systems, performing OFDM receiving and demodulation processing.

50. A method as recited in claim 26, wherein the method further comprises, at the first and second receiving systems, the use of narrowband receivers.

51. A method as recited in claim 26, wherein the method further comprises, at the first and second receiving systems, the use of wideband receivers.

52. A non-transitory computer readable medium comprising executable instructions for use by a receiving system deployed in a system for locating wireless transmitters employing an Orthogonal Frequency Division Multiplexing (OFDM) digital modulation scheme, wherein said OFDM scheme comprises transmitting signal components over a plurality of predefined narrowband frequency channels spanning a predefined wideband channel, the computer readable medium comprising executable instructions for causing a receiving system to carry out a method comprising the steps of:
at a first receiving system, receiving a fraction of the signal components transmitted by a first wireless transmitter to be located in a fraction of the narrowband frequency channels, and processing said fraction of the signal components to derive location related measurements including a first time of arrival for a first received RF signal component;
wherein the processing at the first receiving system comprises:
converting the first received RF signal component to a first digital baseband OFDM signal;
performing a Fast Fourier Transform (FFT) of the first digital baseband OFDM signal provided by the first frequency conversion circuit;
producing coded bits based on the output of the FFT circuit
reconstructing the first digital baseband OFDM signal based on the coded bits; and
correlating the reconstructed first digital baseband OFDM signal with the first digital baseband OFDM signal, wherein a correlation function peak is indicative of the first time of arrival for the first received RF signal component;
at a second receiving system which is geographically separated from said first receiving system, receiving said fraction of the signal components transmitted by said first wireless transmitter, and processing said fraction of the signal components to derive location related measurements including a second time of arrival for the RF signal as received at the second receiving system;
wherein the processing at the second receiving system comprises:
receiving the coded bits produced by the first receiving system and producing the first reconstructed digital baseband OFDM signal; and
correlating the first reconstructed digital baseband OFDM signal with a second digital baseband OFDM signal derived by the second receiving system, wherein a peak of the correlation function is indicative of a second time of arrival for the RF signal as received at the second receiving system; and
processing said location related measurements from said first and second receiving systems to compute the location of said wireless transmitter;
wherein said fraction of the narrowband MHz frequency channels includes at least one pilot channel in which said first wireless transmitter transmits energy, and wherein the first and second receiving systems use signal components in the pilot channel for signal acquisition and demodulation.

53. A computer readable medium as recited in claim 52, wherein said location related measurements comprise time difference of arrival (TDOA) measurements.

54. A computer readable medium as recited in claim 52, wherein said location related measurements comprise time of arrival (TOA) measurements.

55. A computer readable medium as recited in claim 52, wherein said location related measurements comprise angle of arrival (AOA) measurements.

56. A computer readable medium as recited in claim 52, wherein said location related measurements comprise round trip time measurements.

57. A computer readable medium as recited in claim 52, wherein said location related measurements comprise received power measurements.

58. A computer readable medium as recited in claim 52, wherein said fraction of the narrowband frequency channels includes at least one pilot channel in which said first wireless transmitter transmits energy, and wherein signal components in said pilot channel are used to aid in signal acquisition and demodulation.

59. A computer readable medium as recited in claim 52, wherein said fraction of the narrowband frequency channels excludes guard channels in which said first wireless transmitter transmits minimal energy.

60. A computer readable medium as recited in claim 52, wherein said receiving system includes a radio frequency (RF) filter, and wherein the method includes receiving signal components within a bandwidth compatible with said RF filter.

61. A computer readable medium as recited in claim 52, wherein said receiving system includes an intermediate frequency (IF) filter, and wherein the method includes receiving signal components within a bandwidth compatible with said IF filter.

62. A computer readable medium as recited in claim 52, wherein said receiving system includes an analog to digital converter (ADC) characterized by a sample rate, and wherein the method includes receiving signal components within a bandwidth compatible with said sample rate.

63. A computer readable medium as recited in claim 62, wherein said ADCs are further characterized by a sample rate after decimation, and wherein the method includes receiving signal components within a bandwidth compatible with said sample rate after decimation.

64. A computer readable medium as recited in claim 52, wherein said receiving system includes available memory for storing data representing received signal components, and wherein the method includes receiving signal components within a bandwidth compatible with said available memory.

65. A computer readable medium as recited in claim 52, wherein said receiving system includes digital signal processors (DSPs) characterized by DSP processing throughput, and wherein the method includes receiving signal components within a bandwidth compatible with said DSP processing throughput.

66. A computer readable medium as recited in claim 52, wherein the method includes, at the receiving system, receiving signal components within a bandwidth compatible with a current load on the receiving system.

67. A computer readable medium as recited in claim 52, wherein the method includes, at the receiving system, tuning to a plurality of channels to receive signals from a plurality of wireless transmitters to be located.

68. A computer readable medium as recited in claim 52, wherein the method includes, at the receiving system, tuning to a plurality of selected channels, wherein said selected channels are determined based upon interference levels.

69. A computer readable medium as recited in claim 68, wherein said selected channels are determined based upon measurements of received signals.

70. A computer readable medium as recited in claim 68, wherein said selected channels are determined based upon spectrum usage.

71. A computer readable medium as recited in claim 52, wherein the method further comprises, at the receiving system, collection of multiple slices of spectrum for bandwidth synthesis.

72. A computer readable medium as recited in claim 52, wherein the method further comprises, at the receiving system, use of a sequential pattern of re-tuning a frequency agile receiver to cover a substantial part of an OFDM waveform spectrum.

73. A computer readable medium as recited in claim 52, wherein the method further comprises, at the receiving system, use of a bandwidth synthesis process to provide increased resolution in a cross-correlation function to reduce multipath delay spread.

74. A computer readable medium as recited in claim 52, wherein the method further comprises the use a station-based processing method.

75. A computer readable medium as recited in claim 52, wherein the method further comprises, at the receiving system, performing OFDM receiving and demodulation processing.

76. A computer readable medium as recited in claim 52, wherein the method further comprises, at the receiving system, the use of narrowband receivers.

77. A computer readable medium as recited in claim 52, wherein the method further comprises, at the receiving system, the use of wideband receivers.

78. A network-based system for locating wireless transmitters employing an Orthogonal Frequency Division Multiplexing (OFDM) digital modulation scheme, wherein said OFDM scheme comprises transmitting signal components over a plurality of narrowband frequency channels spanning a wideband channel, wherein the narrowband frequency channels have a bandwidth on the order of 3-5 MHz and the wideband channel has a bandwidth on the order of 20 MHz, comprising:
   (a) a first receiving system configured to receive a fraction of the signal components transmitted by a first wireless transmitter to be located in a fraction of the narrowband 3-5MHz frequency channels, wherein said fraction of the narrowband 3-5 MHz frequency channels includes at least one pilot channel in which said first wireless transmitter transmits energy;
   wherein said first receiving system comprises:
      (a1) a first frequency conversion circuit configured to convert a first received RF signal component to a first digital baseband OFDM signal having a sample rate which is substantially lower than the 48 MHz required to properly sample a 20 MHz signal, wherein the first frequency conversion circuit includes a filter bandwidth which is substantially less than 20 MHz;
      (a2) a Fast Fourier Transform (FFT) circuit configured to perform an FFT of the first digital baseband OFDM signal provided by the first frequency conversion circuit;
      (a3) a demodulation circuit configured to produce coded bits based on the output of the FFT circuit;
      (a4) a first reconstruction circuit configured to reconstruct the first digital baseband OFDM signal based on the coded bits produced by the demodulation circuit, wherein the first reconstruction circuit is configured to modulate the coded bits into one of PSK or QAM symbols, and to perform an inverse FFT (IFFT) of the symbols to produce a first reconstructed digital baseband OFDM signal; and
      (a5) a first correlation processing system configured to correlate the first reconstructed digital baseband OFDM signal with the first digital baseband OFDM signal, wherein a correlation function peak is indicative of a first time of arrival (TOA) for the first received RF signal component;
   (b) a second receiving system configured to receive said fraction of the signal components transmitted by said first wireless transmitter, wherein said second receiving system comprises:
      (b1) a second reconstruction circuit configured to receive the coded bits produced by the first demodulation circuit of the first receiving system and to produce the first reconstructed digital baseband OFDM signal; and
      (b2) a second correlation processing system configured to correlate the first reconstructed digital baseband OFDM signal with a second digital baseband OFDM signal derived by the second receiving system, wherein a peak of the correlation function is indicative of a second time of arrival (TOA) for the RF signal as received at the second receiving system; and
   (c) a processing system, operatively coupled to said first and second receiving systems, wherein said processing system is configured to use the first and second TOA values from said first and second receiving systems to compute the location of said wireless transmitter.

79. A system as recited in claim 78, wherein the system is configured to use signal components in said pilot channel to aid in signal acquisition and demodulation.

80. A system as recited in claim 78, wherein the second reconstruction circuit is configured to modulate the coded bits into one of PSK or QAM symbols in the form of baseband sample data, and to perform an inverse FFT (IFFT) of the symbols to produce a second reconstructed OFDM signal.

81. A system as recited in claim 78, wherein the system is configured to locate WiFi transmitters.

82. A system as recited in claim 78, wherein the system is configured to locate WiMAX transmitters.

83. A system as recited in claim 78, wherein said location related measurements derived by said first and second receiving systems comprise time difference of arrival (TDOA) measurements.

84. A system as recited in claim 78, wherein said fraction of the predefined narrowband frequency channels excludes guard channels in which said first wireless transmitter transmits minimal energy.

85. A system as recited in claim 78, wherein said first and second receiving systems each include a radio frequency (RF) filter, and wherein the first and second receiving systems are each configured to receive signal components within a bandwidth compatible with said RF filter.

86. A system as recited in claim 78, wherein said first and second receiving systems each include an intermediate frequency (IF) filter, and wherein the first and second receiving systems are each configured to receive signal components within a bandwidth compatible with said IF filter.

87. A system as recited in claim 78, wherein said first and second receiving systems each include an analog to digital converter (ADC) characterized by a sample rate, and wherein the first and second receiving systems are each configured to receive signal components within a bandwidth compatible with said sample rate.

88. A system as recited in claim 87, wherein said ADCs are further characterized by a sample rate after decimation, and wherein the first and second receiving systems are configured to receive signal components within a bandwidth compatible with said sample rate after decimation.

89. A system as recited in claim 78, wherein said first and second receiving systems each include available memory for storing data representing received signal components, and wherein said first and second receiving systems are configured to receive signal components within a bandwidth compatible with said available memory.

90. A system as recited in claim 78, wherein said first and second receiving systems each include digital signal processors (DSPs) characterized by DSP processing throughput, and wherein said first and second receiving systems are configured to receive signal components within a bandwidth compatible with said DSP processing throughput.

91. A system as recited in claim 78, wherein said first and second receiving systems are configured to receive signal components within a bandwidth compatible with a current load on the receiving system.

92. A system as recited in claim 78, wherein said first and second receiving systems are configured to tune to a plurality of channels to receive signals from a plurality of wireless transmitters to be located.

93. A system as recited in claim 78, wherein said first and second receiving systems are configured to tune to a plurality of selected channels, wherein said selected channels are determined based upon interference levels.

94. A system as recited in claim 93, wherein said selected channels are determined based upon measurements of received signals.

95. A system as recited in claim 93, wherein said selected channels are determined based upon spectrum usage.

96. A system as recited in claim 78, wherein said first and second receiving systems are configured for collection of multiple slices of spectrum for bandwidth synthesis.

97. A system as recited in claim 78, wherein said first and second receiving systems are configured for use of a sequential pattern of re-tuning a frequency agile receiver to cover a substantial part of an OFDM waveform spectrum.

98. A system as recited in claim 78, wherein said system is configured for use of a bandwidth synthesis process to provide increased resolution in a cross-correlation function to reduce multipath delay spread.

* * * * *